May 12, 1925.

A. C. BEARDSLEE 1,537,060

METHOD OF COMBINING AND DESICCATING SUBSTANCES

Filed Feb. 24, 1922   3 Sheets-Sheet 1

May 12, 1925.

A. C. BEARDSLEE 1,537,060

METHOD OF COMBINING AND DESICCATING SUBSTANCES

Filed Feb. 24, 1922      3 Sheets-Sheet 2

May 12, 1925.

A. C. BEARDSLEE 1,537,060

METHOD OF COMBINING AND DESICCATING SUBSTANCES

Filed Feb. 24, 1922   3 Sheets-Sheet 3

INVENTOR
A. C. Beardslee.
By
Denison Thompson
ATTORNEYS

Patented May 12, 1925.

1,537,060

UNITED STATES PATENT OFFICE.

ARTHUR CARL BEARDSLEE, OF ARCADE, NEW YORK, ASSIGNOR TO MERRELL-SOULE COMPANY, OF SYRACUSE, NEW YORK, A CORPORATION OF NEW YORK.

METHOD OF COMBINING AND DESICCATING SUBSTANCES.

Application filed February 24, 1922. Serial No. 538,888.

*To all whom it may concern:*

Be it known that I, ARTHUR CARL BEARDS-LEE, of Arcade, in the county of Wyoming, in the State of New York, have invented new and useful Improvements in Methods of Combining and Desiccating Substances, of which the following, taken in connection with the accompanying drawings, is a full, clear, and exact description.

This invention relates to a process for simultaneously combining and desiccating two liquids.

There are many liquid substances that it is desirable to reduce to dry form in combined condition, such, as for instance, milk and eggs, and there are many other substances that are not adapted for desiccation by the spraying process, or when desiccated by that process do not process a stable powder. For instance, fruit juice, such as orange or lemon juice, when atomized into a current of moisture-absorbing air, and practically all of the liquid constituents of the juice vaporized, becomes a product of a more or less gummy nature, or perhaps a powdered product of extremely hygroscopic character, so that when exposed to the atmosphere it becomes of a gummy, sticky nature, and is, therefore, of an unstable character. With such substances, it is desirable to combine a drying promoter which will render the dry powder quite stable. Such a substance is glucose, or corn syrup, a product produced by the hydrolysis of starch, or in many cases starch itself is an efficient and desirable drying promoter, and the object of this invention is, therefore, to produce an improved process for effecting simultaneous combination and desiccation of such liquids for any purpose.

Other objects and advantages relate to the details of the process, all as will more fully appear from the following description, taken in connection with the accompanying drawings, in which:—

Figure 1:
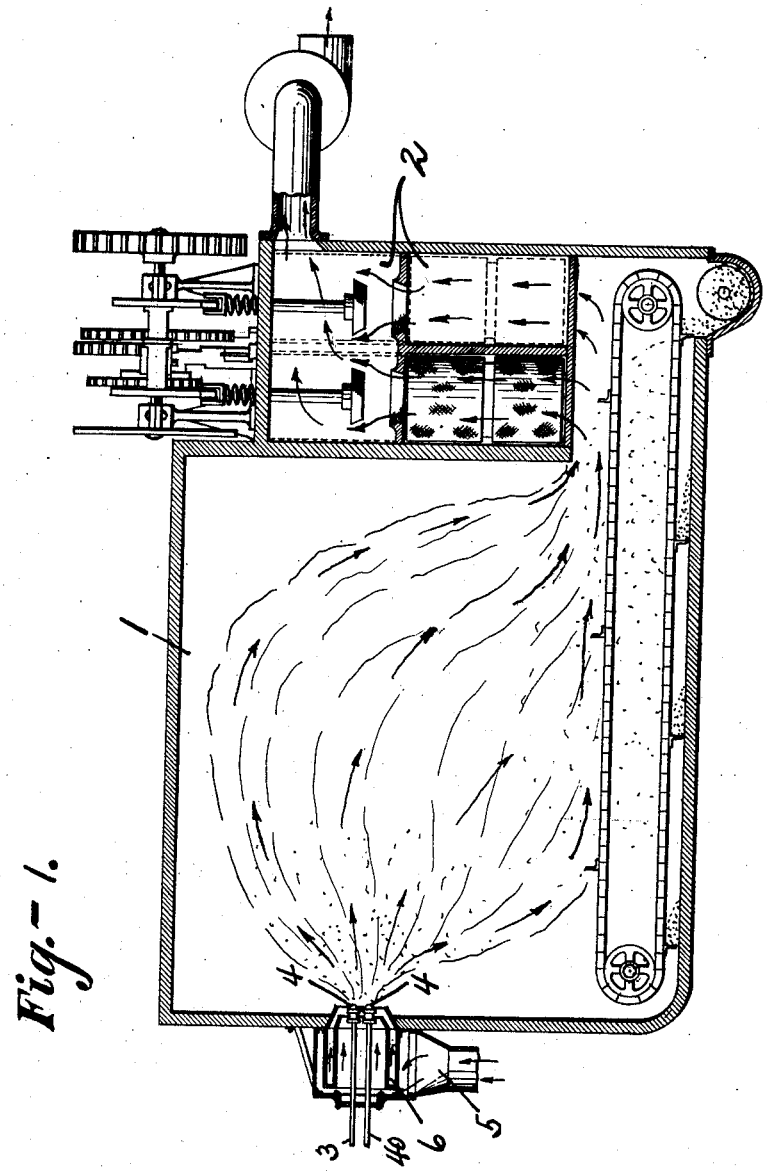
Figure 1 is a sectional view of an apparatus capable of use in carrying out my invention.
Figure 2:
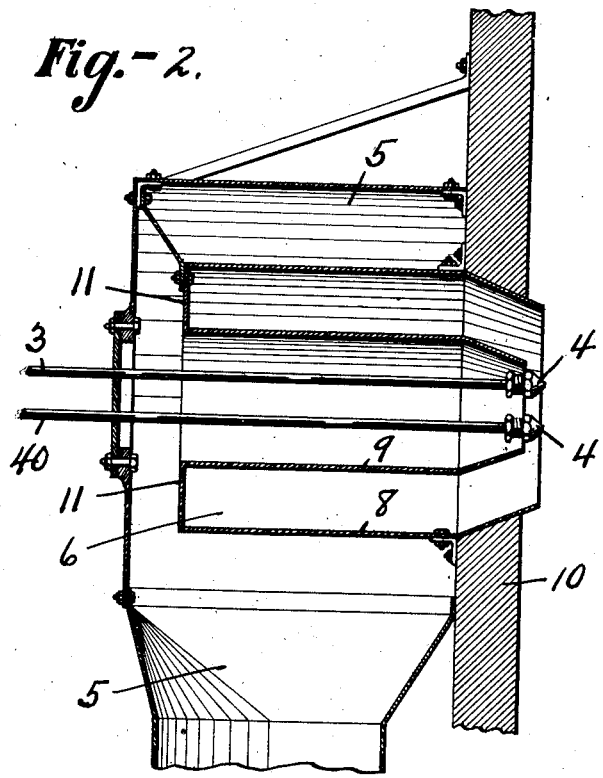
Figure 2 is an enlarged sectional view of the air-introducing device.
Figure 3:
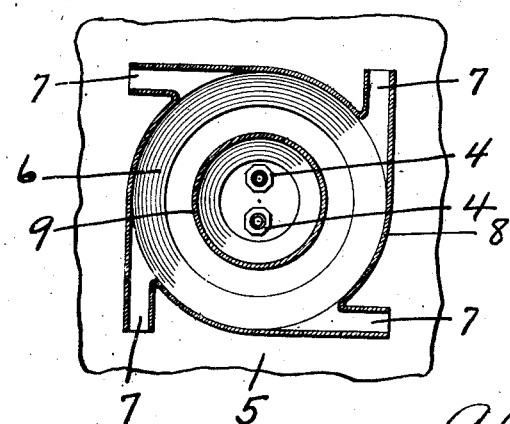
Figure 3 is a section of the air introducing device taken at right angles to Figure 2.
Figure 4:
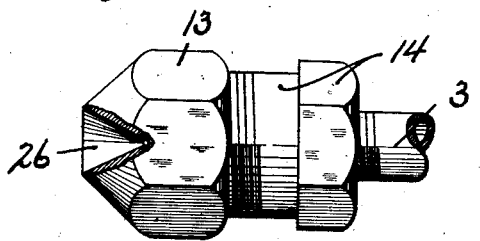
Figure 4 is a side elevation of a suitable spray nozzle.
Figure 5:
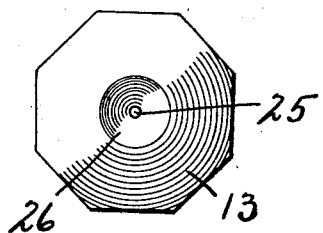
Figure 5 is an end elevation of the same.
Figure 6:
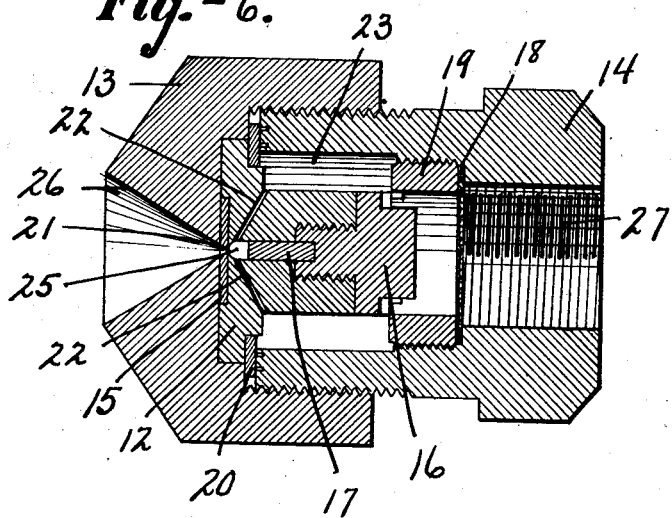
Figure 6 is a longitudinal section of the same.

The general form of the desiccating chamber and collector disclosed in Figure 1 is substantially the same as the structure disclosed in Letters-Patent No. 1,088,436 issued Feb. 24, 1914, to Merrell-Soule Company, as the assignor of I. S. Merrell, while the air introducing devices are substantially the same as disclosed in Letters-Patent No. 1,102,601, issued to Merrell-Soule Company as the assignor of I. S. Merrell and O. E. Merrell, and the spray nozzle shown is substantially the same as that disclosed in Letters-Patent No. 1,183,393 issued to Merrell-Soule Company as the assignor of I. S. Merrell and O. E. Merrell.

The desiccating devices comprise a desiccating chamber —1— of any suitable form and shape having a suitable screened outlet or dust collector —2—, the construction of the latter being substantially the same as that shown in said Letters-Patent referred to. Should it be desirable to simultaneously combine and desiccate milk and eggs or fruit juice and some liquid product produced by the hydrolysis of starch, as for instance, glucose, the fruit juice is forced under high pressure thru a pipe —3—, while the glucose is forced under high pressure through a pipe —40—, both of which pipes terminate in a spray nozzle —4—, by means of which the liquid substances are divided into infinitesimal particles. The spray nozzles may be arranged in any suitable or desired relative position, and as shown, terminate in approximately the same vertical plane so that the sprays issuing therefrom are minutely commingled, and unite at the same time that their moisture content is being removed by vaporization. These atomized or sprayed liquids are injected into a current of heated air introduced through the air conveying devices with the result that the liquids combine and unite and are instantaneously and practically completely dried by vaporization of the water contents of the sprays, the air and vapor escaping from the chamber preferably through suitable screening devices, while the practically dry powder gravitates to the floor of the chamber or is collected and separated from the air and vapor by the screening devices.

The air introducing devices shown comprise a wind trunk —5— through which air is forced by any suitable air blower or pump (not shown). This wind trunk communicates with an air whirling chamber disposed intermediate the wind trunk and the desiccating chamber. This chamber —6— is preferably substantially circular in cross section, and receives heated air under pressure from the trunk —5— through a plurality of tangential inlet channels —7—. These channels are shown as four in number equally spaced around the whirling chamber, and of substantially equal conveying capacity. Each channel may extend the length of the cylindrical part —8— of the chamber —6—. The air portion of the trunk —5— through these tangential channels is set into rapid whirling motion by cylindrical walls —8— and —9— of said chamber. The axis of the chamber —6— is preferably horizontal and at substantially right angles to the walls of the desiccating chamber —1—. This air whirling chamber may be formed by a pair of substantially concentric walls —8— and —9— connected at their rear by transverse annular wall —11—, said concentric wall having its forward end tapered forwardly to form an annular constructed outlet communicating with the desiccating chamber. Preferably the taper of the wall —8— is somewhat greater than the taper of the wall —9— to further restrict the outlet and increase the pressure under which the air passes into the desiccating chamber.

The wall —9— may terminate a short distance at the rear of the termination of the wall —10—, and as the wall —9— is open at its rear it constitutes a substantially cylindrical chamber through which the pipes —3— and —40— pass to the spray nozzles —4—, and preferably the forward end of the spray nozzles are just in front of the termination of the wall —8—. This cylindrical chamber formed within the wall —9— communicates at its rear with the trunk —5—, and acts to convey a direct current of air surrounding an enveloping the spray as it is propelled from the spraying devices, all surrounded and enveloped by the whirling current of air issuing from the chamber —6—. This construction is peculiarly efficient in effecting instaneous and substantially complete vaporization of the liquid constituents of the atomized combining solution and in effecting an economy in space due perhaps to the rotary movement of the air and spray. The spraying devices, as shown in Figure 6, comprise a body —12—, a cap —13—, a casing —14— secured to the cap by threaded engagement in such a manner as to confine the body —12— between the cap —13— and the casing —14—. Further, the nozzle comprises a spray disk —15—, a clutch —16—, a clutch pin —17—, a screen —18—, a screen supporting ring —19— and a washer —20—, all arranged in substantially the manner disclosed in the aforesaid patents so that the body —12— has a liquid whirling chamber —21—, at the middle of its outer sides, to which the liquid is conveyed by two ducts —22— and communicate at their outer end with the chamber —23— of the casing. The spray disk has a minute central orifice —25— communicating with the whirling chamber —21— and leading to the evase ajutage —26— formed in the cap —13—. The casing —14— is interiorly threaded at —27— to receive the liquid conveying pipe —3— or the liquid conveying pipe —41— through which the liquid is forced under high pressure (as 2000 to 3000 pounds to the square inch) by any suitable means as a pump (not shown).

The operation of this combining and desiccating apparatus is substantially as follows: The air is introduced under pressure through the trunk —5— and forced into the desiccating chamber through the concentric chambers of the air introducing device in the manner heretofore described. The liquid is introduced into this current of heated air in atomized condition, the liquid as orange or lemon juice being introduced through the pipe —3— and its spray nozzle —4—, while the drying promoter, as for instance, glucose, is introduced through the pipe —40— and its nozzle —4—. The atomized liquids forcibly intermingled and combined are carried spirally forward by the heated current of air, and the liquid constitutents are substantially completely vaporized. A portion of the resulting powder gravitates to the bottom of the desiccating chamber, and the remaining portion is carried by the escaping air into the dust collecting or screening device —2— whereby the air and vapor are separated from the powder carried thereby, the air and vapor escaping, while the powder is retained within the collecting device, and in the use of this particular apparatus, the powder is later deposited within the desiccating chamber and commingled with the powder primarily collecting therein.

It will be obvious that by this process in the utilization of the substances described there results a powder which consists of the solids of the juice of a fruit combined with a drying promoter, in this instance, a product produced by the hydrolysis of starch, preferably glucose, and such product is of a stable, nonhygroscopic nature and can be returned to form a palatable fruit juice by the mere addition of the required amount of water. In referring to the product of the spraying process described herein as comprising or consisting of spherical particles, I mean to include particles constituting complete spheres or fragments thereof. The expressions "a product of hydrolyzed starch" or "a product produced by the hydrolysis of starch" is deemed to include not only the immediate product such as glucose, of varying contents of dextrin, dextrose and maltose, but also the derivatives or components of such product.

It will be understood that I have described a specific method of simultaneously combining and desiccating two liquid substances or solutions and have illustrated a specific apparatus as utilizable in the carrying out of that process. I do not desire to limit myself to any particular liquid substances to be combined or to the specific details of the preferred process as herein described as various changes and modifications may be made in the details of the process and in the material to be simultaneously combined and desiccated without departing from this invention, as set forth in the appended claims.

I claim:

1. The process consisting in atomizing two liquid substances in such a manner as to forcibly intermingle and combine the substances and simultaneously subjecting the intermingled combining substances to the action of a current of moisture-absorbing air to reduce the combined substance to a powder.

2. The process consisting in forcibly intermingling and combining two different liquid substances while in atomized form and simultaneously subjecting the combining substances to the action of a current of moisture-absorbing air to reduce the combined substances to a powder.

3. The process comprising reducing a liquid substance to atomized form, forcibly injecting into said atomized liquid a different liquid substance in atomized form to thoroughly intermingle and combine the minute particles of the substances and simultaneously subjecting the combining substances to the action of a current of moisture-absorbing air to reduce the combined substance to a powder.

4. The process consisting in simultaneously combining and desiccating to solid form two different liquid substances.

5. The process of producing a product in powdered form comprising the solids of two different liquid substances comprising combining said liquid substances in atomized form and while in that form subjecting the combining, combined atomized liquids to the action of a current of moisture-absorbing air.

6. The process comprising combining two different liquids while in atomized form and desiccating the combined liquids while in that form to solid form.

In witness whereof I have hereunto set my hand this 18 day of February, 1922.

ARTHUR CARL BEARDSLEE.

Witnesses:
D. H. HICKS,
D. C. BENTLY.